United States Patent
Kim et al.

(10) Patent No.: US 8,669,953 B2
(45) Date of Patent: Mar. 11, 2014

(54) MOBILE TERMINAL AND METHOD OF CONTROLLING THE SAME

(75) Inventors: Youngjin Kim, Seoul (KR); Namsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 13/171,141

(22) Filed: Jun. 28, 2011

(65) Prior Publication Data

US 2012/0013553 A1 Jan. 19, 2012

(30) Foreign Application Priority Data

Jul. 16, 2010 (KR) ........................ 10-2010-0068844

(51) Int. Cl.
| | | |
|---|---|---|
| *G09G 5/00* | (2006.01) | |
| *G06T 15/00* | (2011.01) | |
| *G06F 3/00* | (2006.01) | |
| *G06F 3/14* | (2006.01) | |
| *G06F 3/033* | (2013.01) | |

(52) U.S. Cl.
USPC ........... 345/173; 345/661; 345/419; 715/700; 715/864; 715/769

(58) Field of Classification Search
USPC ............................ 345/173, 169, 661, 30–111; 715/200–277, 700–867; 340/699, 340/407.2; 705/50–79; 709/201–229; 700/701–866
See application file for complete search history.

(56) References Cited

U.S. PATENT DOCUMENTS

| | | | |
|---|---|---|---|
| 2008/0122737 A1 | 5/2008 | Lea et al. | |
| 2009/0178008 A1* | 7/2009 | Herz et al. | 715/840 |
| 2009/0303204 A1 | 12/2009 | Nasiri et al. | |
| 2010/0013651 A1 | 1/2010 | Spalink | |
| 2010/0134312 A1* | 6/2010 | Park et al. | 340/689 |
| 2010/0299598 A1* | 11/2010 | Shin et al. | 715/702 |
| 2011/0193857 A1* | 8/2011 | Filippov et al. | 345/419 |
| 2011/0254792 A1* | 10/2011 | Waters et al. | 345/173 |
| 2012/0166987 A1* | 6/2012 | Kang et al. | 715/765 |
| 2012/0176403 A1* | 7/2012 | Cha et al. | 345/619 |

FOREIGN PATENT DOCUMENTS

EP 1 703 706 9/2006

OTHER PUBLICATIONS

European Search Report dated Nov. 2, 2011 for Application No. 11005449.1.

* cited by examiner

*Primary Examiner* — Kent Chang
*Assistant Examiner* — Nelson Rosario
(74) *Attorney, Agent, or Firm* — KED & Associates LLP

(57) ABSTRACT

A mobile terminal may display a first one of a plurality of wallpapers on a touch screen, display an item on the screen, recognize a request to arrange the item, change the wallpaper displayed on the touch screen based on a determined motion of the mobile terminal, and display the item on a selected wallpaper.

19 Claims, 19 Drawing Sheets

(S1301) (S1302)

MOBILE TERMINAL AND METHOD OF CONTROLLING THE SAME

CROSS-REFERENCE TO RELATED APPLICATION

This application claims priority from Korean Patent Application No. 10-2010-0068844, filed Jul. 16, 2010, the subject matter of which is incorporated herein by reference.

BACKGROUND

1. Field

Embodiments may relate to a mobile terminal and a control method thereof.

2. Background

Terminals may include mobile terminals and stationary terminals. The mobile terminals may be classified into handheld terminals and vehicle mount terminals based on whether users can personally carry the terminals.

BRIEF DESCRIPTION OF THE DRAWINGS

Arrangements and embodiments may be described in detail with reference to the following drawings in which like reference numerals refer to like elements and wherein.

DETAILED DESCRIPTION

Embodiments may relate to a mobile terminal and a method of controlling a mobile terminal that are capable of improving user convenience when items are arranged on a home screen.

Embodiments may be described with reference to accompanying drawings, in which exemplary embodiments may be shown. Embodiments may be embodied in many different forms and should not be construed as being limited to embodiments set forth herein. Rather, embodiments may be provided so that this disclosure will be thorough and complete, and may fully convey the concept of embodiments to those skilled in the art.

A mobile terminal may be described with reference to the accompanying drawings. In the following description, suffixes "module" and "unit" may be given to components of the mobile terminal in consideration of only facilitation of description and may not have meanings or functions discriminated from each other.

A mobile terminal may include a cellular phone, a smart phone, a laptop computer, a digital broadcasting terminal, personal digital assistants (PDA), a portable multimedia player (PMP), a navigation system and/or so on.

However, those skilled in the art may understand that configurations according to embodiments may also be applied to stationary terminals, such as digital TV and desktop computers, except an example where the configurations may be applied to only mobile terminals.

Figure 1:
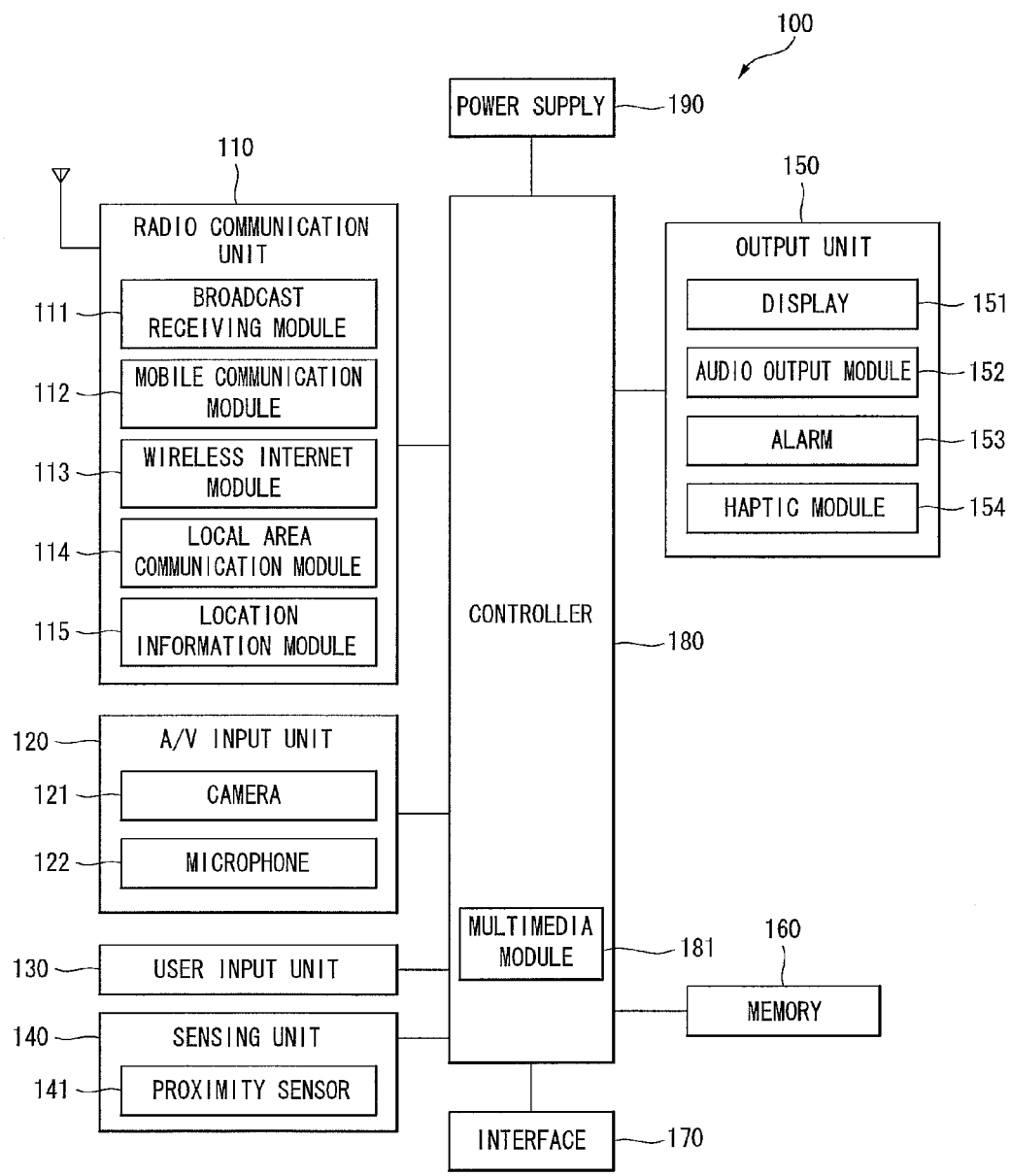
FIG. 1 is a block diagram of a mobile terminal according to an embodiment.

FIG. 1 is a block diagram of a mobile terminal according to an example embodiment. Other embodiments, configurations and arrangements may also be provided. As shown, a mobile terminal 100 may include a radio communication unit 110, an audio/video (A/V) input unit 120, a user input unit 130, a sensing unit 140, an output unit 150, a memory 160, an interface 170, a controller 180 and a power supply 190. The components shown in FIG. 1 may not be essential parts, and a number of components included in the mobile terminal may vary.

Components of the mobile terminal may now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114 and a location information module 115 (or position information module).

The broadcasting receiving module 111 may receive broadcasting signals and/or broadcasting related information from an external broadcasting management server through a broadcasting channel.

The broadcasting channel may include a satellite channel and a terrestrial channel. The broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals and data broadcasting signals, but also signals in the form of a combination of a TV broadcasting signal and a radio broadcasting signal.

The broadcasting related information may be information on a broadcasting channel, a broadcasting program and/or a broadcasting service provider. The broadcasting related information may be provided even through a mobile communication network. The broadcasting related information may be received by the mobile communication module 112.

The broadcasting related information may exist in various forms. For example, the broadcasting related information may exist in the form of an electronic program guide (EPG) of digital multimedia broadcasting (DMB) or in the form of an electronic service guide (ESG) of digital video broadcast-handheld (DVB-H).

The broadcasting receiving module 111 may receive broadcasting signals using various broadcasting systems. The broadcasting receiving module 111 may receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 may be suited to broadcasting systems providing broadcasting signals other than the above-described digital broadcasting systems.

The broadcasting signals and/or broadcasting related information received through the broadcasting receiving module 111 may be stored in the memory 160.

The mobile communication module 112 may transmit/receive a radio signal to/from at least one of a base station, an external terminal and/or a server on a mobile communication network. The radio signal may include a voice call signal, a video telephony call signal or data in various forms according to transmission and reception of text/multimedia messages.

The wireless Internet module 113 may be a module for wireless Internet access and may be included in the mobile terminal 100 or may be externally attached to the mobile terminal 100. Wireless LAN (WLAN) (Wi-Fi), wireless broadband (Wibro), world interoperability for microwave access (Wimax), high speed downlink packet access (HSDPA) and/or so on may be used as a wireless Internet technique.

The local area communication module 114 may be a module for local area communication. Bluetooth, radio frequency identification (RFID), infrared data association (IrDA), ultra wideband (UWB) and/or ZigBee may be used as a local area communication technique.

The location information module 115 (or position information module) may confirm or obtain a position of the mobile terminal 100. A global positioning system (GPS) module may be a representative example of the location information module 115. The location information module 115 may calculate information on distances between one point (object) and at least three satellites and information on a time when the distance information is measured and apply trigonometry to the obtained distance information to obtain three-dimensional position information on the point (object) according to latitude, longitude and altitude at a predetermined time. Further, a method of calculating position and time information using three satellites and correcting the calculated position and time information using another satellite may also be used. Additionally, the location information module 115 may continuously calculate the current position in real time and calculate velocity information using the position information.

As shown in FIG. 1, the A/V input unit 120 may be used to input an audio signal or a video signal, and may include a camera 121 and a microphone 122. The camera 121 may process image frames of still images or moving images obtained by an image sensor in a video telephony mode or in a photographing mode. The processed image frames may be displayed on a display 151.

The image frames processed by the camera 121 may be stored in the memory 160 or may be transmitted to an external device through the radio communication unit 110. The mobile terminal 100 may include at least two cameras according to constitution of the mobile terminal.

The microphone 122 may receive an external audio signal in a call mode, a recording mode and/or a speed recognition mode, and may process the received audio signal into electric audio data. The audio data may be converted into a form that can be transmitted to a mobile communication base station through the mobile communication module 112 and output in the call mode. The microphone 122 may employ various noise removal algorithms for removing noise (or canceling noise) generated when the external audio signal is received.

The user input unit 130 may receive input data for controlling an operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as open/close state of the mobile terminal 100, a position of the mobile terminal 100, whether a user touches the mobile terminal 100, a direction of the mobile terminal 100 and acceleration/deceleration of the mobile terminal 100, and the sensing unit 140 may generate a sensing signal for controlling an operation of the mobile terminal 100. For example, the sensing unit 140 may sense whether a slide phone is opened or closed when the mobile terminal 100 is the slide phone. Further, the sensing unit 140 may sense whether the power supply 190 supplies power and whether the interface 170 is connected to an external device. The sensing unit 140 may include a proximity sensor.

The output unit 150 may generate visual, auditory or tactile output, and may include the display 151, an audio output module 152, an alarm 153 and a haptic module 154.

The display 151 may display information processed by the mobile terminal 100. For example, the display 151 may display UI or graphic user interface (GUI) related to a telephone call when the mobile terminal 100 is in the call mode. The display 151 may display a captured and/or received image, UI or GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display.

Some of these displays may be of a transparent type or a light transmission type. This may be referred to as a transparent display. The transparent display may include a transparent liquid crystal display. The rear structure of the display 151 may also be of the light transmission type. According to this structure, a user may see an object located behind a body of the mobile terminal 100 through an area of the body of the mobile terminal 100, which is occupied by the display 151.

The mobile terminal 100 may include at least two displays 151 according to constitution of the mobile terminal 100. For example, the mobile terminal 100 may include a plurality of displays that are arranged on a single face at a predetermined distance or integrated thereto. The plurality of displays may also be arranged on different sides.

In an example where the display 151 and a sensor sensing touch (hereafter referred to as a touch sensor) may form a layered structure, which may hereinafter be referred to as a touch screen, the display 151 may be used as an input device in addition to an output device. The touch sensor may be in the form of a touch film, a touch sheet and a touch pad, for example.

The touch sensor can be constructed such that it converts a variation in pressure applied to a specific portion of the display 151 or a variation in capacitance generated at a specific portion of the display 151 into an electric input signal. The touch sensor can be constructed such that it can sense pressure of touch as well as position and area of touch.

When a touch input is applied to the touch sensor, a signal corresponding to the touch input may be transmitted to a touch controller. The touch controller may process the signal and transmit data corresponding to the processed signal to the controller 180. Accordingly, the controller 180 may detect a touched portion of the display 151.

The proximity sensor 141 may be located in an internal region of the mobile terminal 100, surrounded by the touch screen, or near the touch screen. The proximity sensor may sense an object approaching a predetermined sensing face or an object located near the proximity sensor using electromagnetic force or infrared rays without having a mechanical contact. The proximity sensor may have a lifetime longer than a lifetime of a contact sensor, and may have wide application.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen may be constructed such that proximity of a pointer is detected through a variation in an electric field based on the proximity of the pointer. The touch screen (touch sensor) may be classified as a proximity sensor.

For ease of explanation, an action of approaching the pointer to the touch screen while the pointer is not in contact with the touch screen such that a location of the pointer on the touch screen is recognized may be referred to as "proximity touch" and an action of bring the pointer into contact with the touch screen may be referred to as "contact touch." A proximity touch point of the pointer on the touch screen may mean a point of the touch screen to which the pointer corresponds perpendicularly to the touch screen when the pointer proximity-touches the touch screen.

The proximity sensor may sense a proximity touch and a proximity touch pattern (e.g. a proximity touch distance, a proximity touch direction, a proximity touch velocity, a proximity touch time, a proximity touch position, a proximity touch moving state, etc.). Information corresponding to the sensed proximity touch action and proximity touch pattern may be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions (e.g. a call signal incoming tone, a message incoming tone, etc.) performed in the mobile terminal 100. The audio output module 152 may include a receiver, a speaker, a buzzer, etc.

The alarm 153 may output a signal for indicating generation of an event of the mobile terminal 100. Examples of events generated in the mobile terminal 100 may include receiving of a call signal, receiving of a message, input of a key signal, input of touch, etc. Other events may also be provided. The alarm 153 can output signals in forms different from video signals or audio signals (e.g. a signal for indicating generation of an event through vibration). The video signals or the audio signals may also be output through the display 151 or the audio output module 152.

The haptic module 154 may generate various haptic effects that the user may feel. A representative example of the haptic effects is vibration. An intensity and pattern of vibration generated by the haptic module 154 may be controlled. For example, different vibrations may be combined and output or sequentially output.

The haptic module 154 may generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 may not only transmit haptic effects through direct contact, but also allow the user to feel haptic effects through kinesthetic sense of the user's fingers or arms. The mobile terminal 100 may include at least two haptic modules 154 according to constitution of the mobile terminal 100.

The memory 160 may store a program for operation of the controller 180 and may temporarily store input/output data (e.g. phone book, messages, still images, moving images, etc.). The memory 160 may store data about vibrations and sounds in various patterns that are output from when a touch input is applied to the touch screen.

The memory 160 may include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage that performs the storing function of the memory 160 on the Internet.

The interface 170 may serve as a path to all external devices connected to the mobile terminal 100. The interface 170 may receive data from the external devices or power, and may transmit the data or power to the internal components of the mobile terminal 100 or transmits data of the mobile terminal 100 to the external devices. The interface 170 may include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating an authority to use the mobile terminal 100 and may include a user identify module (UIM), a subscriber identify module (SIM) and a universal subscriber identify module (USIM). A device (hereinafter referred to as an identification device) including the identification module may be manufactured in the form of a smart card. Accordingly, the identification device may be connected to the mobile terminal 100 through a port.

The interface 170 may serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle may be used as a signal for confirming whether the mobile terminal 100 is correctly set in the cradle.

The controller 180 may control the overall operation of the mobile terminal 100. For example, the controller 180 may perform control and processing for voice communication, data communication and video telephony. The controller 180 may include a multimedia module 181 for playing multimedia. The multimedia module 181 may be included in the controller 180 or may be separated from the controller 180.

The controller 180 may perform a pattern recognition process capable of recognizing input handwriting or an input picture-drawing applied to the touch screen as characters or images.

The power supply 190 may receive external power and internal power, and may provide power required for the operations of the components of the mobile terminal 100 under the control of the controller 180.

Various embodiments of the present invention may be implemented in a computer or similar device readable recording medium using software, hardware or a combination thereof, for example.

According to hardware implementation, embodiments of the present invention may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some examples, embodiments may be implemented by the controller 180.

According to software implementation, embodiments such as procedures or functions may be implemented with a separate software module executing at least one function or operation. Software codes may be implemented according to a software application written in an appropriate software language. Further, the software codes may be stored in the memory 160 and executed by the controller 180.

Figure 2:
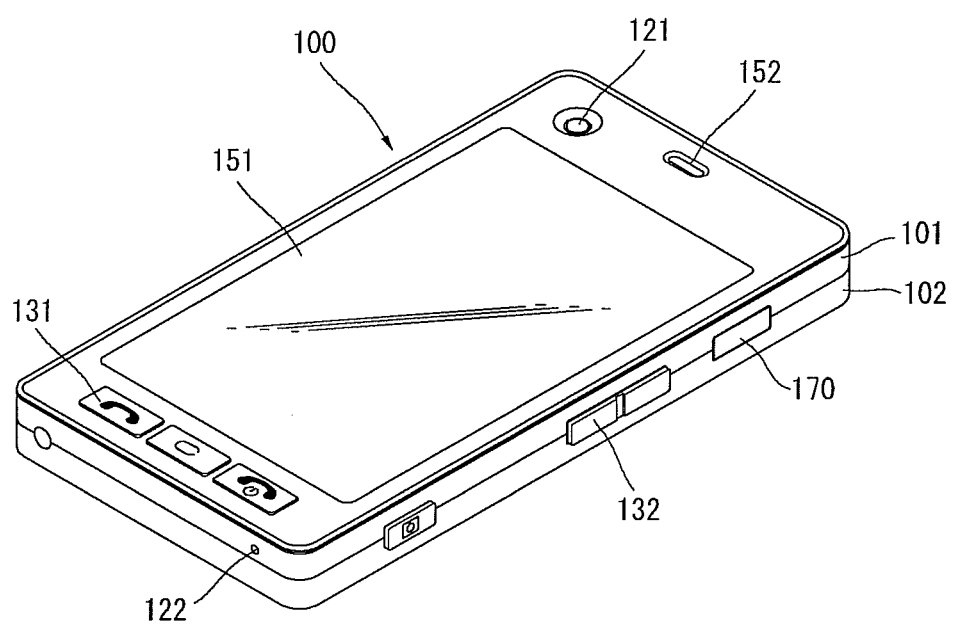
FIGS. 2 and 3 are views of a mobile terminal related to embodiments.

FIG. 2 is a front view of a mobile terminal showing an example of the mobile terminal pertinent to embodiments.

As shown in FIG. 2, the mobile terminal 100 may include a bar type terminal body. However, embodiments are not limited thereto. The mobile terminal 100 may be implemented in a variety of different configurations, such as a slide type, a folder type, a swing type, and/or a swivel type.

The body may include a casing (housing, cover, etc.) that forms an exterior of the mobile terminal 100. The casing may include a front casing 101 and a rear casing 102. Various electric/electronic parts may be provided in a space between the front casing 101 and the rear casing 102. At least one middle casing may be further provided between the front casing 101 and the rear casing 102.

The casings may be formed by injection molding of synthetic resin or may be made of a metal substance, such as stainless steel (STS) or titanium (Ti).

The display 151, the audio output unit 152, the camera 121, the user input units 130 (131, 132), the microphone 122, the interface 170, and the like may be provided on the terminal body, and more particularly on the front casing 101.

The display 151 may occupy most of the main face of the front casing 101. The audio output module 152 and the camera 121 may be provided at an area adjacent to one of both end portions of the display 151, while the user input unit 131 and the microphone 122 are provided at an area adjacent to the other end portion of the display 151. The user input unit 132 and the interface 170 may be provided on the lateral sides of the front and rear casings 101 and 102.

The user input unit 130 may receive commands for controlling operations of the mobile terminal 100. The user input unit 130 may include a plurality of the manipulating units 131 and 132.

The manipulating units 131 and 132 may also be called a manipulating portion, and they may adopt any mechanism of a tactile manner that enables a user to perform a manipulation action by experiencing a tactile feeling.

The contents inputted by the manipulating units 131 and 132 may be diversely set. For example, commands, such as a start, an end, and a scroll, may be inputted to the manipulating unit 131. A command for volume adjustment of sound outputted from the audio output unit 152 and a command for switching to a touch recognizing mode of the display 151 may be inputted to the manipulating unit 132.

Figure 3:
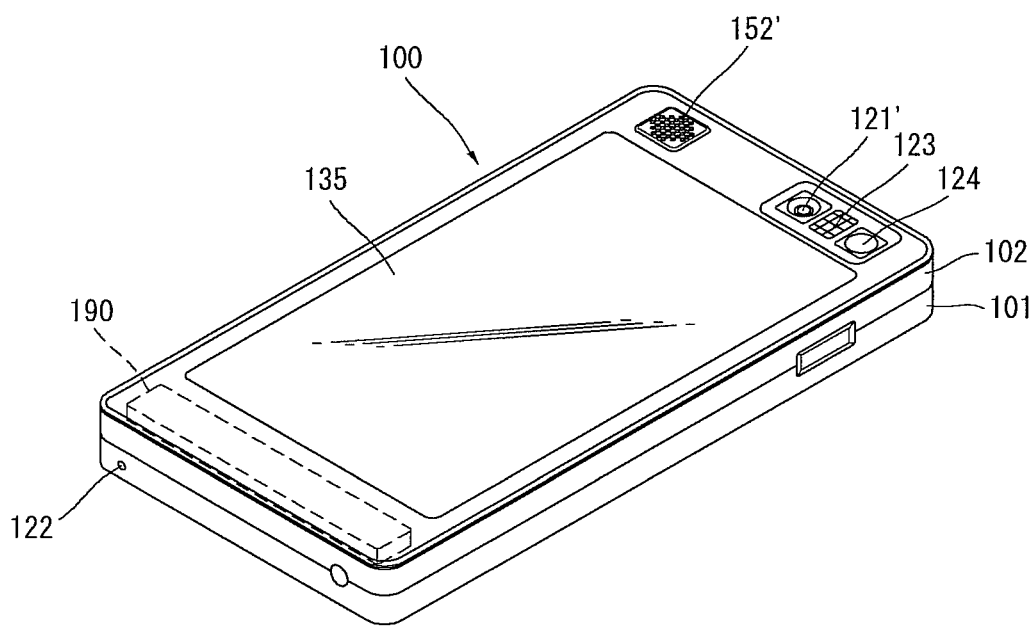

FIG. 3 is a perspective view of a backside of the mobile terminal 100 shown in FIG. 2.

As shown in FIG. 3, a camera 121' may be additionally provided on the backside of the terminal body, and more particularly on the rear casing 102. The camera 121' may have a photographing direction that is substantially opposite to a photographing direction of the camera 121 (FIG. 2) and may have pixels differing from pixels of the camera 121.

For example, the camera 121 may have a lower number of pixels to capture and transmit a picture of a user's face for a video call, while the camera 121' may have a greater number of pixels to capture a common subject for photography without transmitting the captured subject. Each of the cameras 121 and 121' may be installed on the terminal body to be rotated or popped up or both.

A flash 123 and a mirror 124 may be further provided adjacent to the camera 121'. The flash 123 may project light toward a subject in an example where the subject is photographed using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function along with the audio output unit 152 (FIG. 2), and it may be used to implement a speaker phone mode in talking over the terminal.

A broadcast signal receiving antenna 124 may be additionally provided at a lateral side of the terminal body as well as an antenna for communication, etc. The antenna 124 may be considered as being a portion of the broadcast receiving module 111 (FIG. 1) and may be retractably provided on the terminal body.

The power supply 190 for supplying power to the mobile terminal 100 may be mounted on the terminal body. The power supply 190 may be built within the terminal body. Alternatively, the power supply 190 may be detachably connected to the terminal body.

A touchpad 135 for detecting a touch may be further provided on the rear casing 102. The touchpad 135 may be configured in a light-transmittive type like the display 151. If the display 151 is configured to output visual information from both faces, the visual information may be recognized through the touchpad 135 as well. Information outputted from both faces may be controlled by the touchpad 135. Alternatively, an additional display may be provided to the touchpad 135 so that a touch screen may also be provided to the rear casing 102.

The touchpad 135 may be activated in conjunction with the display 151 of the front casing 101. The touchpad 135 may be provided in rear of the display 151 in parallel to one another. A size of the touchpad 135 may be equal to or less than a size of the display 151.

Embodiments disclosed herein may be implemented in the mobile terminal 100 described with respect to FIGS. 1 and 2. Operations of the mobile terminal 100 for implementing embodiments may be described in more detail.

The sensing unit 140 may acquire or determine a rotation of the mobile terminal 100 on an axis (i.e., a rotational speed or an angular velocity based on the rotation of the mobile terminal 100) by using a gyroscope. The sensing unit 140 may acquire or determine an acceleration of gravity based on a motion of the mobile terminal 100 by using an accelerometer. The sensing unit 140 may acquire or determine a direction of the mobile terminal 100 through a terrestrial magnetic sensor such as a compass.

Accordingly, the sensing unit 140 may acquire or determine a motion of the mobile terminal 100 based on at least one of the angular velocity acquired by the gyroscope, the acceleration of gravity acquired by the accelerometer, and the direction of the mobile terminal 100 acquired by the terrestrial magnetic sensor. In an example where the mobile terminal 100 is rotated around the axial line to vertically or horizontally intersect the body of the mobile terminal 100, the sensing unit 140 may acquire or determine a tilt state of the mobile terminal 100, including the degree of a tilt, the velocity of a tilt, the direction of a tilt, of the body of the mobile terminal 100.

The memory 160 may store a plurality of wallpapers in which items may be arranged. The plurality of wallpapers may be obtained by dividing one image into a plurality of regions. Alternatively, the plurality of wallpapers may be composed of different images. In the former example, the memory 160 may divide one image into a plurality of images and store wallpapers mapped to the respective images. In the former example, the memory 160 may divide one image into a plurality of regions and store wallpapers each mapped to information about each of the regions. In the former example, the plurality of wallpapers may be divided such that they overlap with each other within one image. In the latter example, the memory 160 may store wallpapers each mapped to an image.

The display 151 may be implemented using a touch screen.

The controller 180 may control a screen of the mobile terminal 100 by using a motion of the mobile terminal 100 acquired or determined by the sensing unit 140.

A method of controlling the mobile terminal 100 according to a first exemplary embodiment and operations of the mobile terminal 100 for implementing the method may be described with respect to FIGS. 4 to 15.

Figure 4:
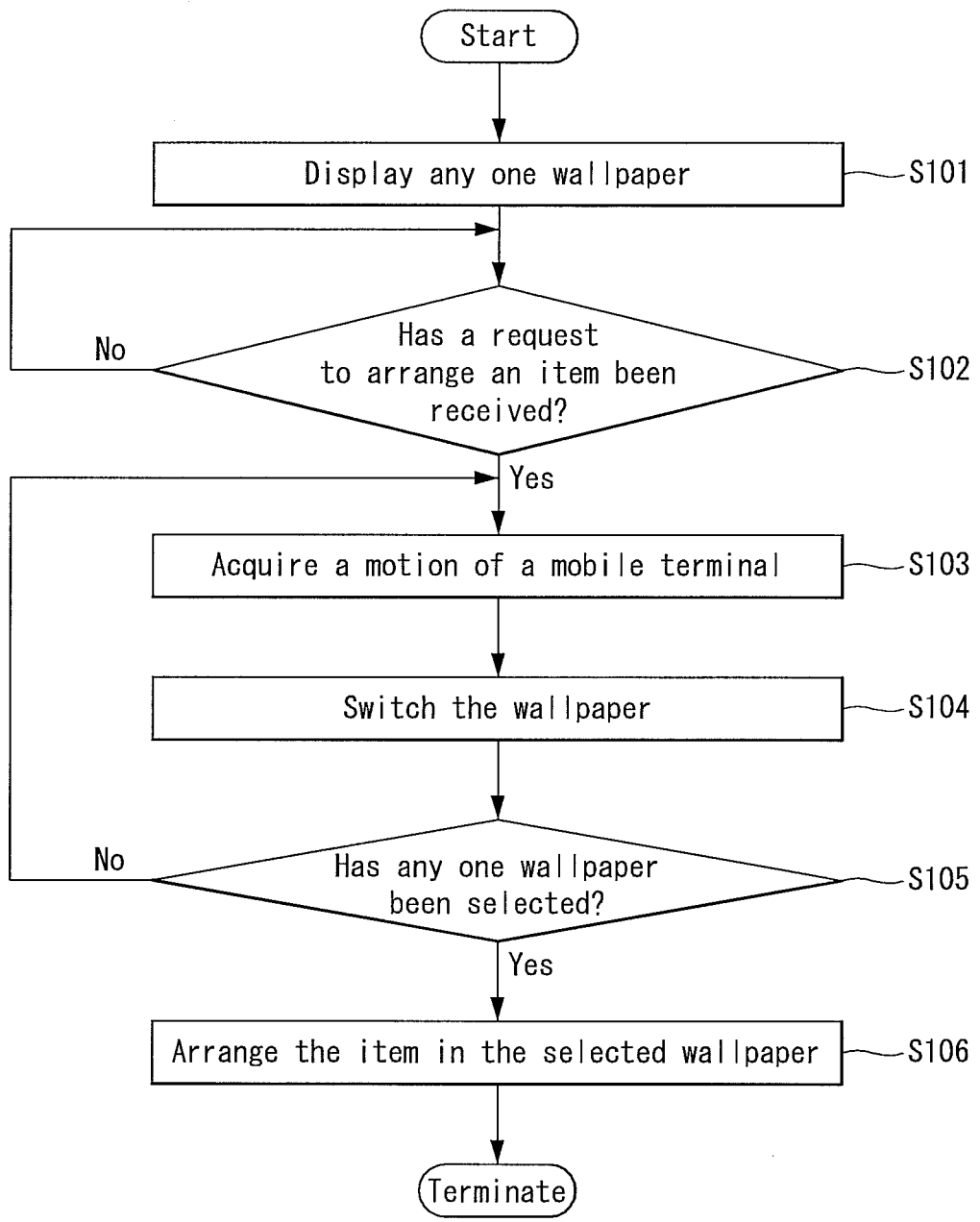
FIG. 4 is a flowchart of a method of controlling a mobile terminal according to a first exemplary embodiment.

FIG. 4 is a flowchart of a method of controlling the mobile terminal 100 according to the first exemplary embodiment. FIGS. 5 to 15 are diagrams illustrating the method of controlling the mobile terminal 100 according to the first exemplary embodiment. Other embodiments and configurations may also be provided.

As shown in FIG. 4, the controller 180 may control any one of a plurality of wallpapers stored in the memory 160 so that the wallpaper is displayed through the touch screen 151 in operation S101. The controller 180 may determine, in operation S102, whether a request to arrange (or provide) a specific displayed item has been received through the touch screen 151. If, as a result of the determination, the request is determined to have been received (or is recognized), the controller 180 may acquire or determine, in operation S103, a motion of the mobile terminal 100 through the sensing unit 140. The request to arrange or provide the item may include a request to rearrange an item selected from the wallpaper displayed on the touch screen 151 or a request to add a new item to the wallpaper. In the former example, a user may select any one item from the wallpaper displayed on the touch screen 151 and request that the selected item be rearranged. In the latter example, the controller 180 may select an item to be newly added to the wallpaper in the state in which a list of items that may be added are displayed in the wallpaper and request that the selected item be arranged (or provide). A state in which the controller 180 is operated to arrange an item when a request to arrange the item is received may hereinafter be referred to as an item arrangement mode.

Figure 5:
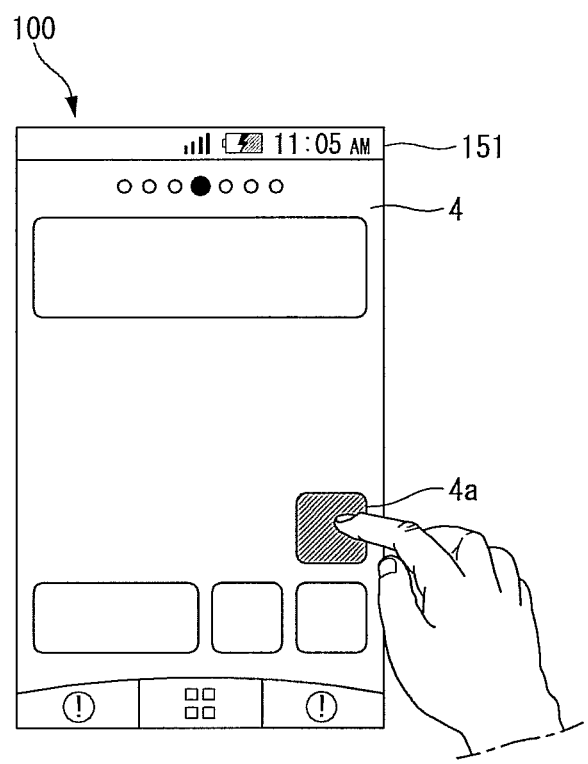
FIGS. 5 and 6 are diagrams showing examples in which an item arrangement request is received in a mobile terminal according to the first exemplary embodiment.
Figure 6:
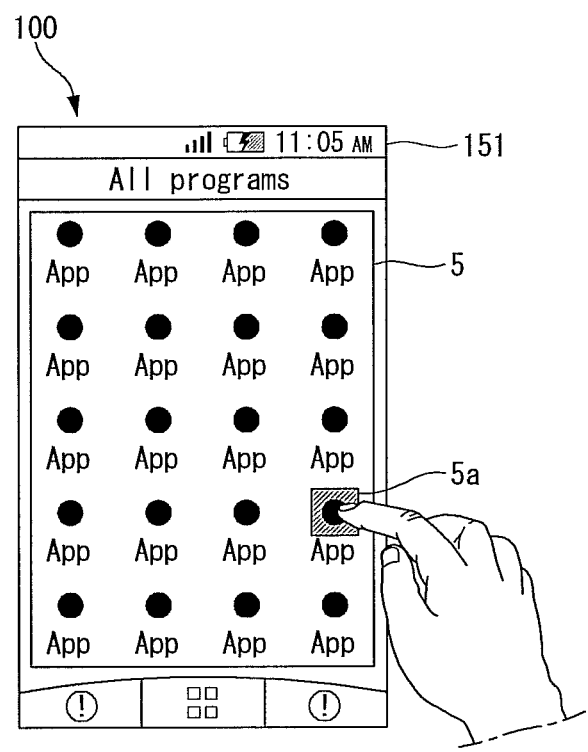

FIGS. 5 and 6 show examples in which an item arrangement request is received and show examples in which an item is arranged on a home screen.

As shown in FIG. 5, the controller 180 may control any one of a plurality of wallpapers constituting the home screen such that the corresponding wallpaper 4 is displayed on the touch screen 151. The wallpaper 4 displayed through the touch screen 151 may include a plurality of items. In one example of a home screen, items included in the wallpaper 4 may include icons and/or widgets. When a specific item 4a displayed on the wallpaper is touched for a predetermined time or greater, the controller 180 may receive a request to arrange the corresponding item 4a. In response to the request, the controller 180 may rearrange or provide the corresponding item 4a in a wallpaper subsequently selected by a user.

As shown in FIG. 6, the controller 180 may control a list 5 of items that may be arranged on a home screen such that the list 5 is displayed on a screen of the mobile terminal 100 through the touch screen 151. When a specific item 5a included in the list 5 is touched for a predetermined time or greater, the controller 180 may receive a request to arrange the corresponding item 5a. That is, the controller 180 may receive a request to newly add the corresponding item 5a to a home screen. In response to the request, the controller 180 may newly arrange the new item 5a in a wallpaper subsequently selected by a user.

Referring to FIG. 4, the controller 180 that has entered the item arrangement mode (based on the received request) may switch or change, in operation S104, a wallpaper displayed on the touch screen 151 based on motion of the mobile terminal 100 determined by the sensing unit 140. As one example, when the mobile terminal 100 is rotated about an axis that vertically intersects the body of the mobile terminal 100 and such that the left side or the right side of the mobile terminal 100 is tilted in a rear direction of the mobile terminal 100, the controller 180 may switch or change a wallpaper displayed on the screen. As another example, when the mobile terminal 100 rotates about an axis that horizontally intersects the body of the mobile terminal 100 and such that the top end portion or the bottom end portion of the mobile terminal 100 is tilted in the rear direction of the mobile terminal 100, the controller 180 may switch or change a wallpaper displayed on a screen. The controller 180 may consecutively change the wallpaper displayed on the screen when the mobile terminal 100 remains tilted and/or may change the wallpaper displayed on the screen whenever the mobile terminal 100 is tilted. In the latter example, the controller 180 may change the wallpaper, displayed on the screen, to a next wallpaper or a previous wallpaper (in an order of the plurality of wallpapers) whenever the mobile terminal 100 is tilted.

FIGS. 7 to 11 are diagrams showing examples in which the mobile terminal 100 that has entered the item arrangement mode switches or changes a displayed wallpaper through the touch screen 151 based on a motion of the mobile terminal 100. In the figures, an operation number may be provided under the mobile terminal 100.

Figure 7:
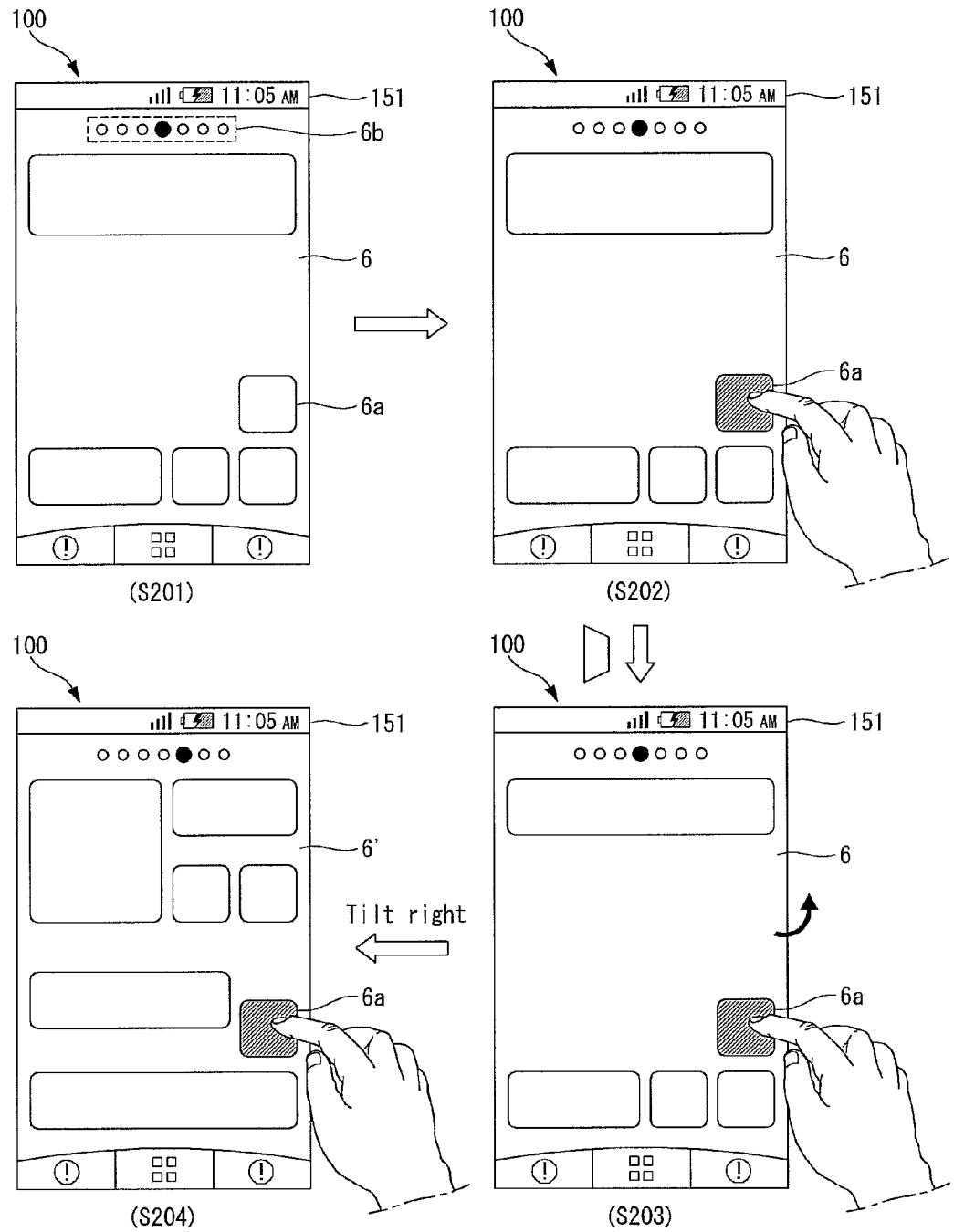
FIGS. 7 to 15 are diagrams showing examples in which a displayed wallpaper is switched through a touch screen based on a motion of a mobile terminal according to the first exemplary embodiment.

As shown in FIG. 7, the controller 180 may control a wallpaper 6 in which a plurality of items are arranged such that the wallpaper 6 is displayed on a screen of the mobile terminal 100 in operation S201. Item 6b displayed on an upper side of the screen may indicate that the wallpaper 6 currently being displayed on the screen corresponds to one of a plurality of wallpapers stored in the memory 160. When a specific item 6a displayed on the screen is touched for a predetermined time or greater, the controller 180 may receive, in operation S202, a request to arrange the corresponding item 6a. The controller 180 may continue to acquire or determine a motion of the mobile terminal 100 through the sensing unit 140 while a touch on the corresponding item 6a remains intact. Further, the controller 180 may analyze the acquired or determined motion. If the mobile terminal 100 is rotated around an axial line that vertically intersects the body of the mobile terminal 100 and is tilted (in operation S203), the controller 180 may switch or change the wallpaper 6 currently being displayed on the screen to another wallpaper in operation S204. For example, in an example where the right side of the body of the mobile terminal 100 is tilted in the rear direction of the mobile terminal 100, the controller 180 may sequentially display one or more wallpapers 6' provided next (in a prearranged order) to the wallpaper 6 that is currently being displayed on the screen, from among a plurality of wallpapers (provided in the prearranged order). Accordingly, when a desired wallpaper is displayed on a screen (of the mobile terminal 100), a user may select the desired wallpaper in which the item 6a is arranged by releasing a touch on the item 6a.

Referring to FIG. 7, in a state in which the specific item 6a is touched, the controller 180 may switch or change the wallpaper 6, currently being displayed on the screen, based on the acquired or determined motion of the mobile terminal 100. However, embodiments are not limited thereto. According to an embodiment, although a touch on the corresponding item 6a is released in the item arrangement mode, the mobile terminal 100 may switch or change the wallpaper 6, currently being displayed on the screen, based on a motion of the mobile terminal 100.

Figure 8:
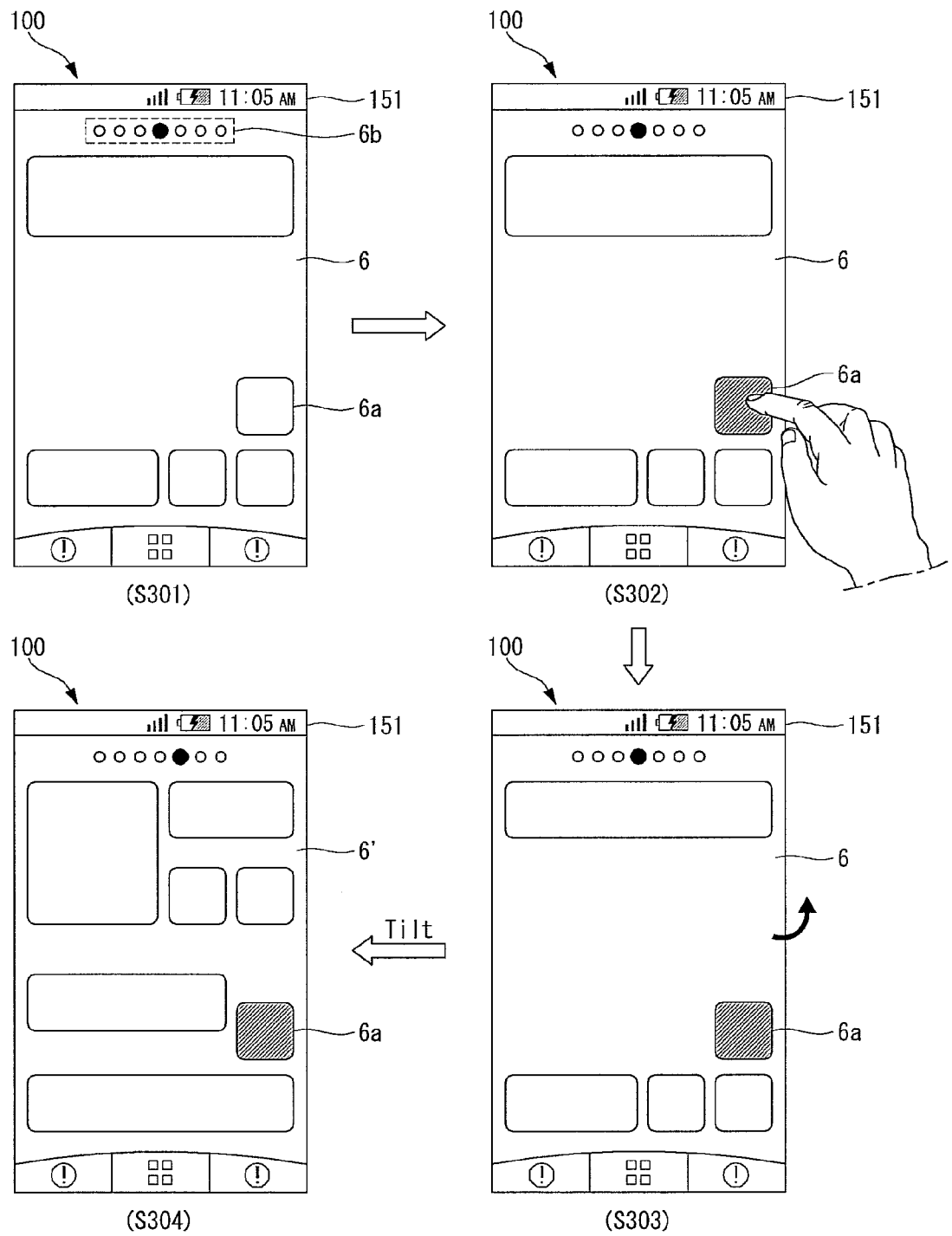

FIG. 8 is a diagram showing an example in which in a state in which a touch for an item for which arrangement has been requested has been released after the mobile terminal 100 enters the item arrangement mode, a wallpaper displayed on a screen is switched or changed based on a motion of the mobile terminal 100.

Referring to FIG. 8, in the state in which the wallpaper 6 (having a plurality of items arranged therein) is displayed in operation S301, when the specific item 6a arranged in the wallpaper 6 is touched for a predetermined time or greater, the controller 180 may receive a request to rearrange the corresponding item 6a in operation S302. In response to the request, the controller 180 may enter the item arrangement mode and acquire or determine a motion of the mobile terminal 100 through the sensing unit 140 regardless of whether there is a touch on the corresponding item 6a. The controller 180 may analyze the acquired or determined motion. In an example where the mobile terminal 100 is rotated around an axial line that vertically intersects the body of the mobile terminal 100 in operation S303, the controller 180 may switch or change the wallpaper 6, currently displayed on the screen, to another wallpaper 6' in operation S304. Accordingly, when the wallpaper 6' is displayed on a screen (of the mobile terminal 100), a user may select the wallpaper 6' in which the item 6a is arranged by touching the wallpaper 6'.

Referring to FIG. 7, although the wallpaper displayed on the screen is switched or changed, the touched item 6a may be displayed at a same location. However, embodiments are not limited thereto. According to an embodiment, the mobile terminal 100 may inactivate the display of the touched item 6a while a wallpaper displayed on a screen is switched or changed based on a motion of the mobile terminal 100, and may activate the display of the item 6a when a wallpaper in which the item 6a will be arranged is selected. When a wallpaper is switched or changed, the mobile terminal 100 may acquire or determine a location where an item 6a selected in the switched wallpaper may be arranged and display the selected item 6a at the corresponding location.

Figure 9:
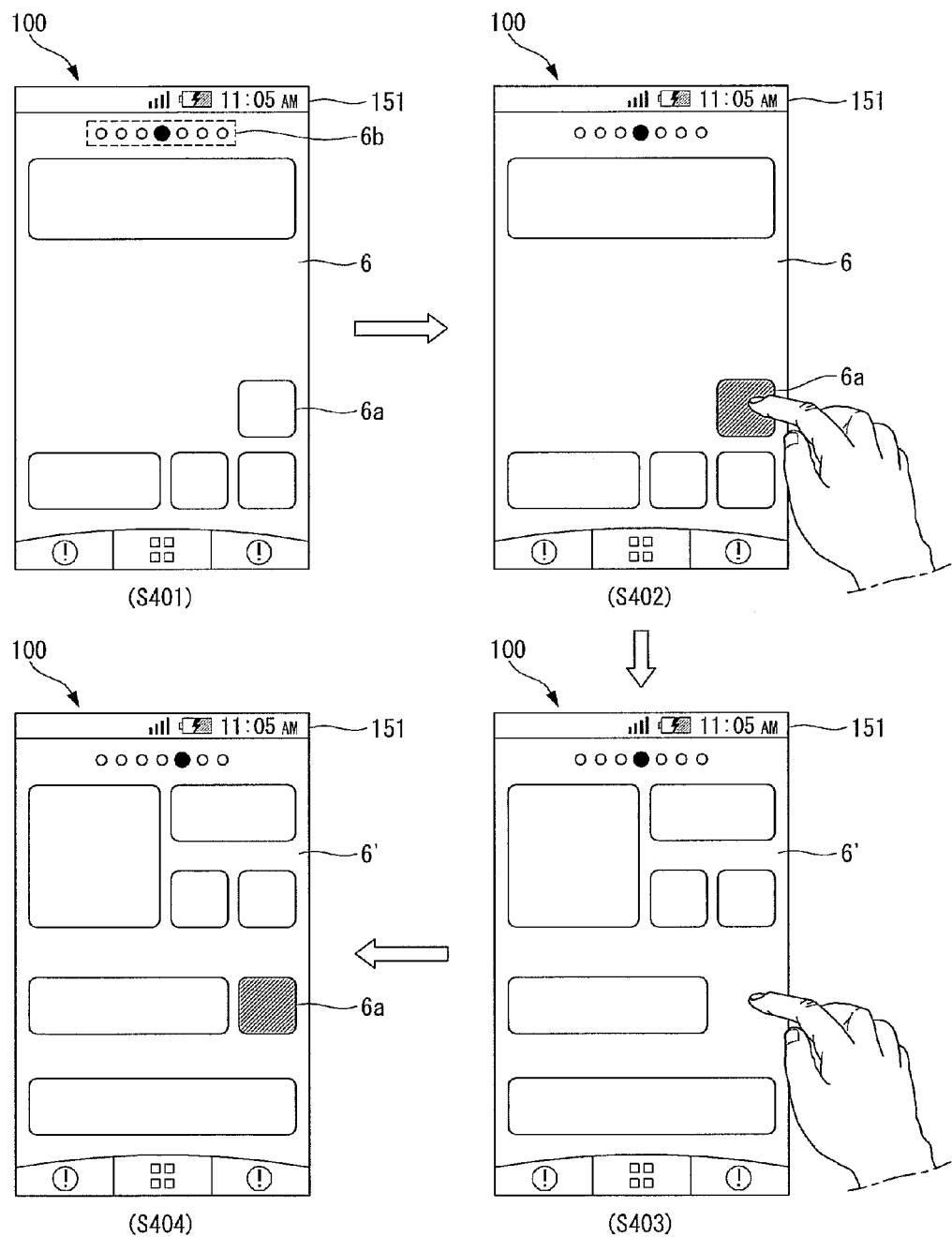
Figure 10:
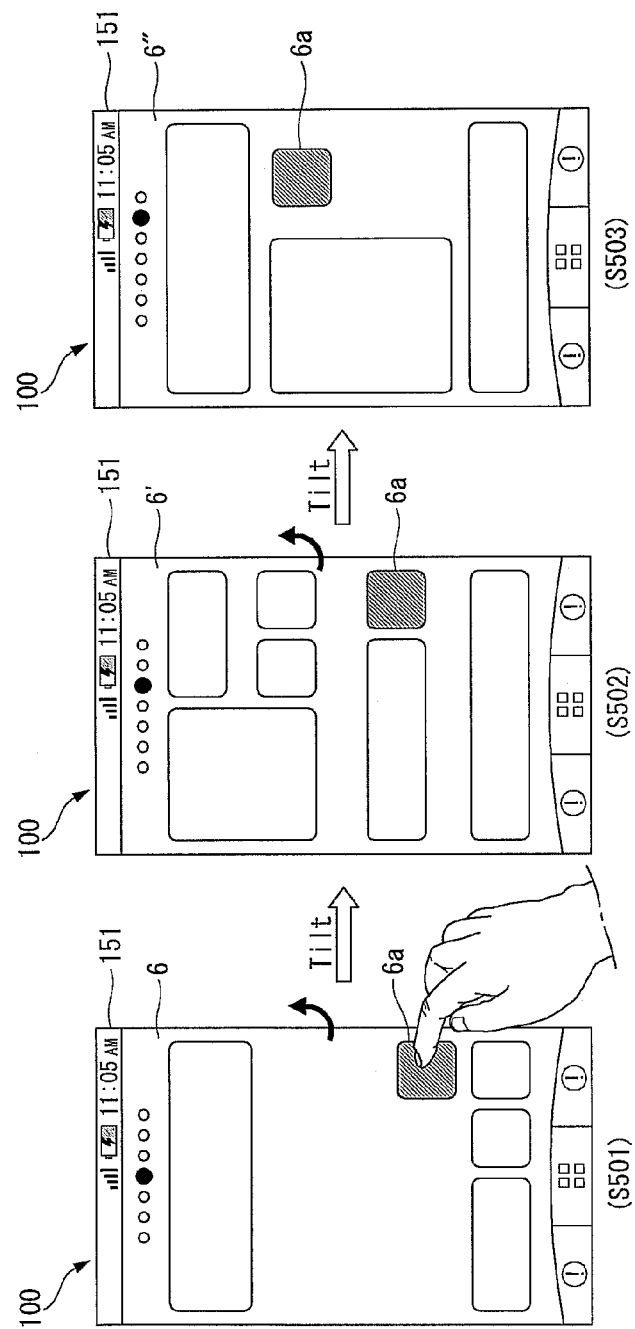

FIGS. 9 and 10 are diagrams showing examples in which when a wallpaper displayed on a screen is switched or changed in the item arrangement mode, an item 6a (for which arrangement has been requested) may be displayed.

As shown in FIG. 9, in the state in which the wallpaper 6 (having a plurality of items arranged therein) may be displayed in operation S401, when the specific item 6a arranged in the wallpaper 6 is touched for a predetermined time or greater, the controller 180 may receive a request to arrange the item 6a in operation S402. In response to the request, the controller 180 may enter the item arrangement mode and switch or change the wallpaper 6, currently being displayed on a screen, based on a motion of the mobile terminal 100 acquired or determined by the sensing unit 140. During a time for which the wallpaper 6 displayed on the screen (of the mobile terminal 100) is switched or changed, the display of the item 6a (for which arrangement has been requested) may be inactivated. Further, when one wallpaper 6' of one or more wallpapers sequentially displayed on a screen is selected in operation S403, the controller 180 may arrange the item 6a (for which arrangement has been requested) in the selected wallpaper 6' and display the item 6a in the wallpaper 6' in operation S404. In particular, when a desired wallpaper is displayed on a screen (of the mobile terminal 100), a user may arrange (or provide) the item 6a at a desired location of the desired wallpaper by touching a location where the item 6a may be provided in the corresponding wallpaper. That is, when the one wallpaper 6' displayed on the screen is touched, the controller 180 may arrange or provide the selected item 6a based on a touched location.

As shown in FIG. 10, when the specific item 6a is touched for a predetermined time or greater on the wallpaper 6 displayed on a screen (of the mobile terminal 100), the controller 180 may receive a request to arrange the item 6a in operation S501. In response to the request, the controller 180 that has entered the item arrangement mode may switch or change the wallpaper 6 displayed on the screen based on a motion of the mobile terminal 100 acquired or determined by the sensing unit 140. Further, whenever a displayed wallpaper is switched or changed, the controller 180 may arrange the item 6a (for which arrangement has been requested) in a wallpaper 6' or 6" and display the item 6a in the wallpaper 6' or 6" in operations S502 and S503. Whenever the wallpaper displayed on the screen is switched or changed, the controller 180 may acquire or determine a location where the item 6a (for which arrangement has been requested) may be arranged or provided in the switched or changed wallpaper based on forms and locations of items arranged in the switched wallpaper and also the form of the item 6a (for which arrangement has been requested). The controller 180 may arrange the item 6a based on the acquired or determined location, and may display the item 6a in the changed wallpaper. In an example where a number of locations where the item 6a may be provided is plural, the controller 180 may provide the item 6a in any one of the locations based on predetermined priority and display the item 6a in the changed wallpaper. The selected item 6a may not be displayed in the changed wallpaper that fails to have an area where the selected item 6a may be provided.

Figure 11:
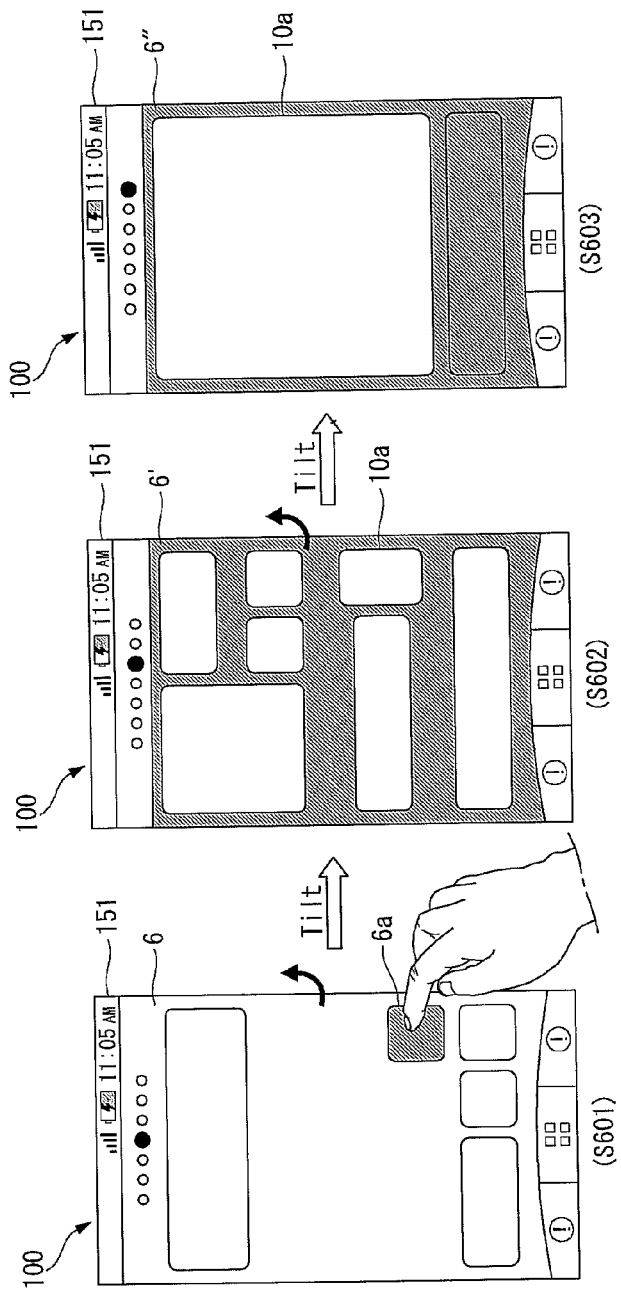

FIG. 11 is a diagram showing an example in which only wallpapers in which a selected item 6a can be provided may be sequentially displayed.

Referring to FIG. 11, in a state in which a fourth wallpaper 6 (of a plurality of wallpapers) is displayed, when the item 6a arranged in the fourth wallpaper 6 is touched for a predetermined time or greater, the controller 180 may receive a request to arrange the corresponding item 6a in operation S601. When the right side of the mobile terminal 100 is tilted in the rear direction of the mobile terminal 100, the controller 180 may sequentially display a fifth wallpaper 6' and a seventh wallpaper 6", in which the item 6a (for which arrangement has been requested) may be arranged or provided, from among wallpapers provided next (in the prescribed order) to the wallpaper 6 currently being displayed, in operations S602 and S603. Whenever the wallpaper is switched or changed, the controller 180 may display an area 10*a* in which the selected item 6*a* may be provided in the switched or changed wallpaper. Accordingly, a user may intuitively check a wallpaper in which the selected item 6*a* may be arranged and a location within the wallpaper.

Referring back to FIG. 4, when the wallpaper currently being displayed is switched or changed in operation S104, the controller 180 may scroll and switch or change the wallpaper such that the wallpaper is naturally switched or changed to a next wallpaper (in a prescribed sequence). The controller 180 may switch or change the wallpaper currently being displayed in such a way as to inactivate the display of the wallpaper and then activate the display of the next wallpaper.

Figure 12:
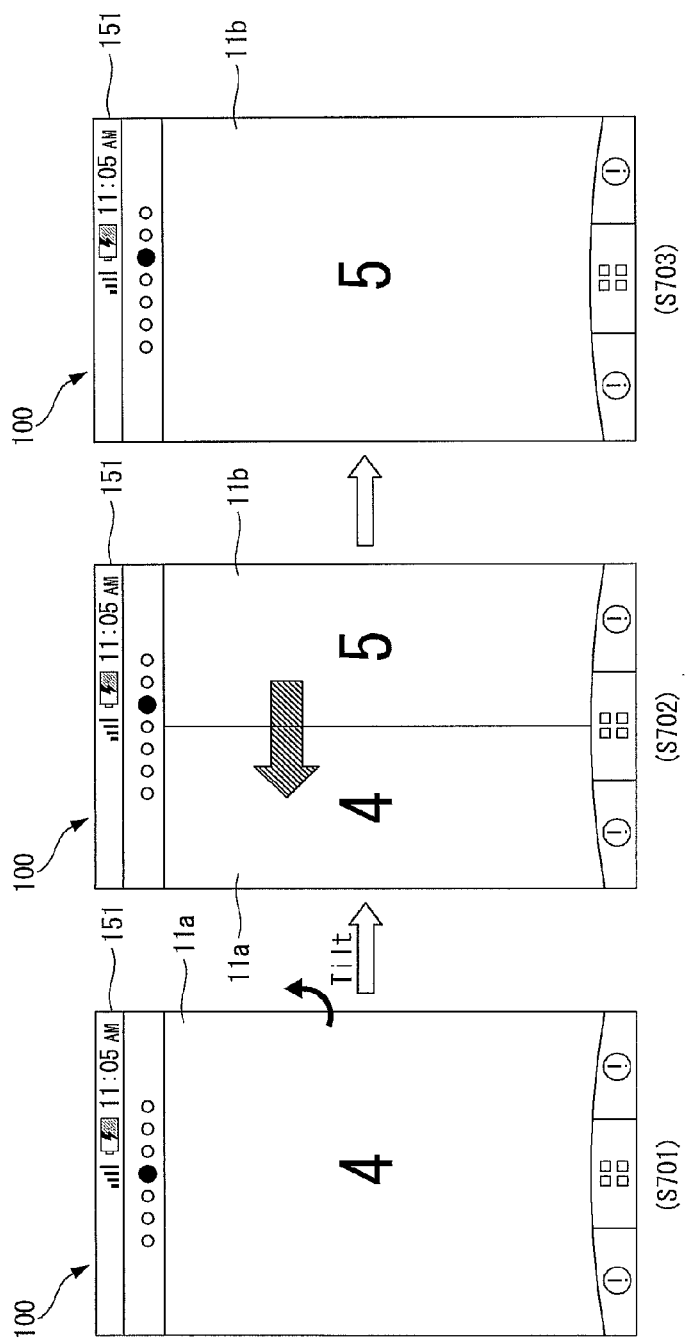
Figure 13:
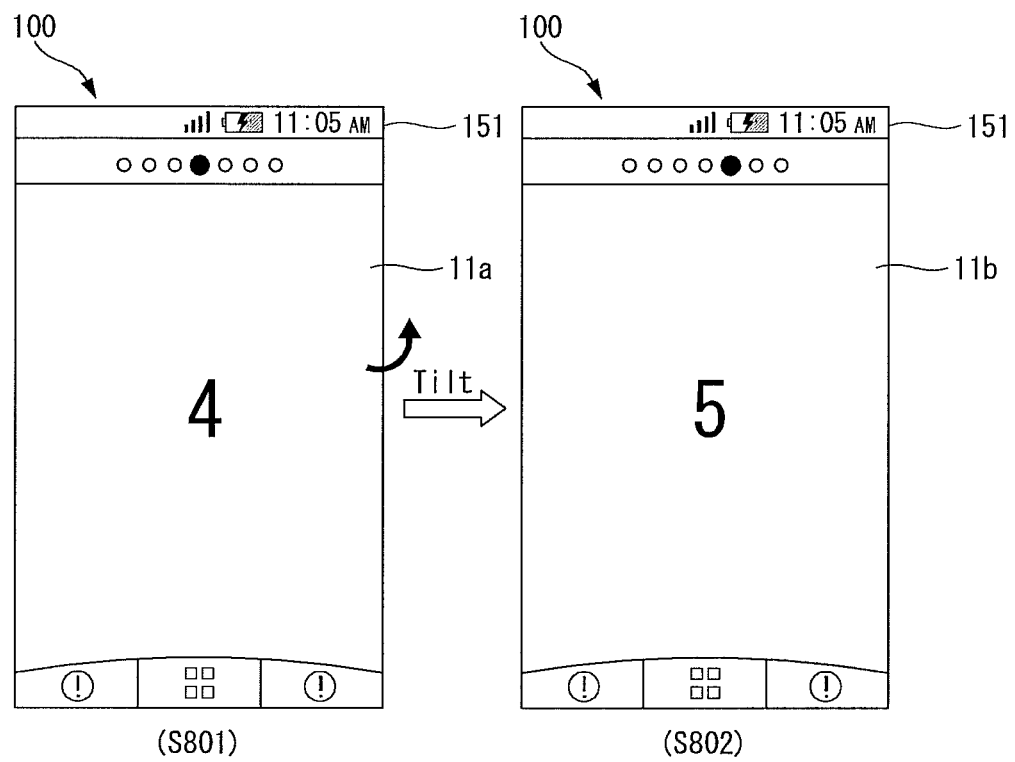

FIGS. 12 and 13 are diagrams showing examples in which a wallpaper displayed on a screen of the mobile terminal 100 is switched or changed.

Referring to FIG. 12, the controller 180 may display a fourth wallpaper 11*a* on a screen of the mobile terminal 100 in operation S701. When the mobile terminal 100 is tilted and a request to switch or change the fourth wallpaper 11*a* displayed on the screen is received, the controller 180 may scroll and display the fourth wallpaper 11*a* and a fifth wallpaper 11*b* such that the fourth wallpaper 11*a* is naturally switched or changed to the fifth wallpaper 11*b* in operations S702 and S703. That is, the controller 180 may control the fifth wallpaper 11*b* so that the fifth wallpaper 11*b* is displayed on an entire wallpaper of the mobile terminal 100 by moving a location where the fourth wallpaper 11*a* and the fifth wallpaper 11*b* are displayed at a certain speed.

Referring to FIG. 13, the controller 180 may display the fourth wallpaper 11*a* on the screen of the mobile terminal 100 in operation S801. When the mobile terminal 100 is tilted and a request to switch or change the fourth wallpaper 11*a* currently being displayed on the screen is received, the controller 180 may inactivate the display of the fourth wallpaper 11*a* and display the fifth wallpaper 11*b* on the entire wallpaper of the mobile terminal 100 in operation S802.

Referring to FIG. 4, when the wallpaper is switched or changed in operation S104, in an example where the switching or changing of the wallpaper is continuously requested based on a motion of the mobile terminal 100, the controller 180 may repeatedly display a plurality of wallpapers, stored in the memory 160, on a screen. For example, when a request to display a previous wallpaper is received in a state in which a first wallpaper is displayed, the controller 180 may display the last wallpaper on the screen. For example, when a request to display a next wallpaper is received in the state in which the last wallpaper is displayed, the controller 180 may display a first wallpaper. If, although a request to switch or change a wallpaper is received based on a motion of the mobile terminal 100, a first or last wallpaper from among the wallpapers stored in the memory 160 may be displayed, and the controller 180 may stop switching or changing the corresponding wallpaper. Further, an example where there is no more wallpaper to be displayed on a screen while the wallpaper is switched or changed through scrolling, the controller 180 may generate a bouncing effect such that a blank area where nothing (or substantially nothing) is displayed may be reflectively scrolled and displayed, scrolled in an opposite direction, and the blank area may then disappear out of a screen. Accordingly, a user may intuitively know that there is no more wallpaper to be displayed on a screen.

Figure 14:
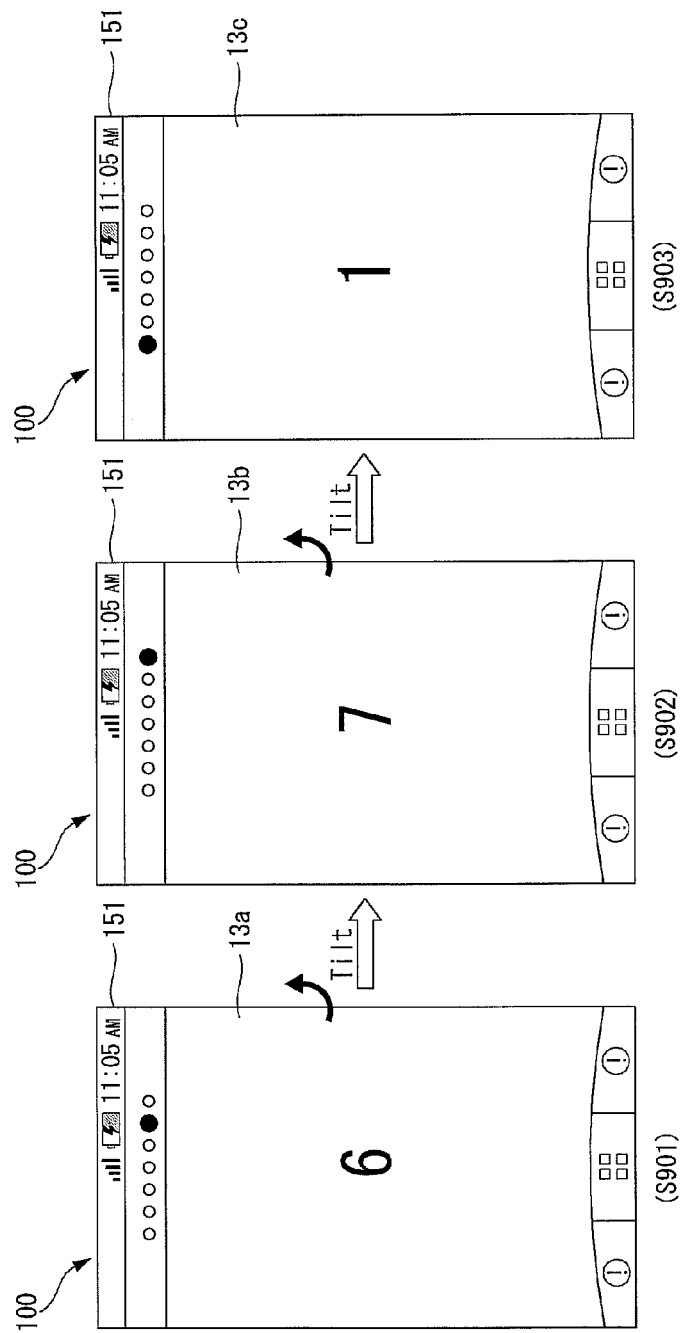
Figure 15:
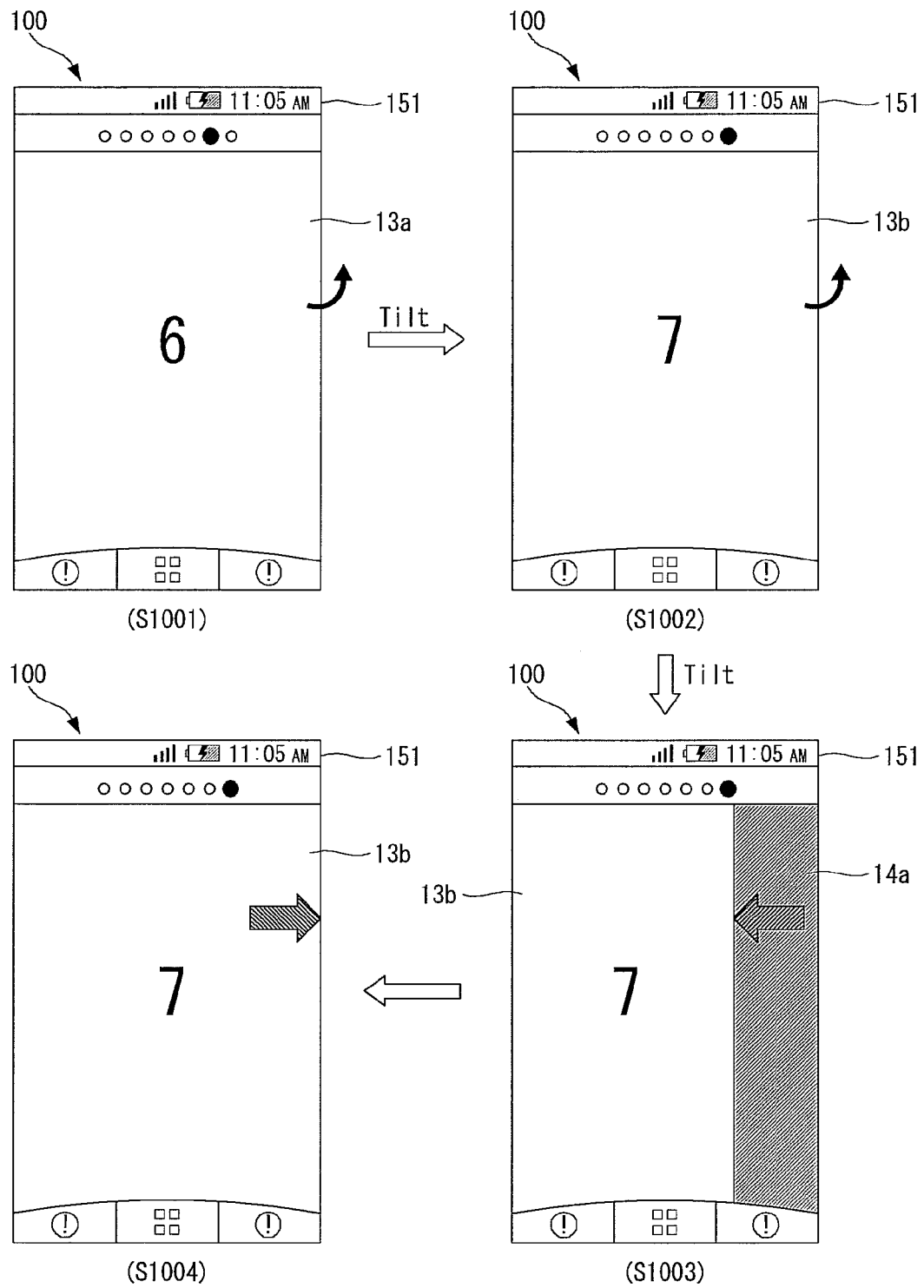

FIGS. 14 and 15 are diagrams showing another example in which a wallpaper displayed on a screen of the mobile terminal 100 may be switched or changed.

Referring to FIG. 14, the memory 160 may store seven wallpapers. In a state in which a sixth wallpaper 13*a* is displayed, when the mobile terminal 100 is tilted and a request to switch or change the sixth wallpaper 13*a* is received in operation S901, the controller 180 may display a seventh wallpaper 13*b* on a screen (of the mobile terminal 100) in operation S902. In the state in which the seventh wallpaper 13*b* is displayed on the screen (of the mobile terminal 100), when the mobile terminal 100 is tilted and a request to display a next wallpaper is received, the controller 180 may display a first wallpaper 13*c*, stored in the memory 160, on the screen of the mobile terminal 100 in operation S903.

Referring to FIG. 15, the memory 160 may store seven wallpapers. In the state in which a sixth wallpaper 13*a* is displayed, when the mobile terminal 100 is tilted and a request to switch or change the sixth wallpaper 13*a* is received in operation S1001, the controller 180 may display a seventh wallpaper 13*b* on a screen of the mobile terminal 100 in operation S1002. Further, in the state in which the seventh wallpaper 13*b* is displayed on the screen (of the mobile terminal 100), if the mobile terminal 100 remains intact, the controller 180 may scroll a blank area 14*a* and display the blank area 14*a* on the screen (of the mobile terminal 100) in operation S1003. The controller 180 may scroll the blank area 14*a* in an opposite direction so that the blank area 14*a* disappears out of the screen (of the mobile terminal 100) in operation S1004. Accordingly, a user can know that a wallpaper is no longer switched or changed although the mobile terminal 100 is further tilted.

Referring back to FIG. 4, the controller 180 may select a next wallpaper according to a direction in which the mobile terminal 100 is tilted in the item arrangement mode (i.e., based on an axis in which the mobile terminal 100 intersects the body of the mobile terminal 100). For example, when the right side of the mobile terminal 100 is tilted in the rear direction of the mobile terminal 100, the controller 180 may display a wallpaper next to a wallpaper, currently being displayed, on a screen of the mobile terminal 100. For example, when the left side of the mobile terminal 100 is tilted in the rear direction of the mobile terminal 100, the controller 180 may display a wallpaper previous to a wallpaper, currently being displayed, on a screen of the mobile terminal 100.

Further, the controller 180 may differently set a speed at which a wallpaper is switched or changed based on the degree that the mobile terminal 100 is tilted in the item arrangement mode (i.e., based on whether the mobile terminal 100 is rotated to some extent based on an axis to intersect the body of the mobile terminal 100). For example, the controller 180 may rapidly set a speed at which a wallpaper is switched or changed with an increase of the degree that the mobile terminal 100 is tilted.

Referring back to FIG. 4, the controller 180 may repeatedly perform the operations S103 and S104 of switching or changing a wallpaper displayed on the touch screen 151 until any one wallpaper has been selected based on a motion of the mobile terminal 100. If any one of the plurality of wallpapers is selected in operation S105, the controller 180 may arrange an item for which arrangement has been requested in the selected wallpaper in operation S106. The item arrangement mode may be terminated.

For example, referring to FIG. 7, in the item arrangement mode, if a user maintains a touch on the touched item 6*a* and a desired wallpaper is displayed on a screen (of the mobile terminal 100), the user may select the desired wallpaper in which the touched item 6*a* will be arranged by releasing the touch on the touched item 6*a*. In this example, the user may arrange the selected item 6*a* at a desired location of the desired wallpaper by dragging the selected item 6*a* to the desired location and then releasing the touch on the selected item 6*a*. Meanwhile, in an example where a speed at which a wallpaper is switched or changed is too fast and a user may not easily release a touch on the item 6*a* in a desired wallpaper, the controller 180 may select a wallpaper, displayed on a screen before a certain period of time from a point of time when a touch on the item 6*a* was released, as a wallpaper in which the item 6*a* will be arranged.

For example, referring to FIG. 9, when a user releases or maintains a touch on the item 6*a* for which arrangement has been requested in the item arrangement mode and a desired wallpaper is displayed on a screen, the user may select the desired wallpaper in which the item 6*a* will be arranged by touching the desired wallpaper. In this example, the user may arrange the item 6*a* at a desired location of the desired wallpaper by touching the desired location.

For example, when a desired wallpaper is displayed on a screen in the item arrangement mode, a user may arrange the item 6*a* in the desired wallpaper by manipulating a specific key. When the wallpaper is selected by the user, the controller 180 may arrange the item 6*a* at a selected location based on predetermined priority within the desired wallpaper.

A method of controlling the mobile terminal 100 according to a second exemplary embodiment and operations of the mobile terminal 100 for implementing the method may be described with respect to FIGS. 16 to 19.

Figure 16:
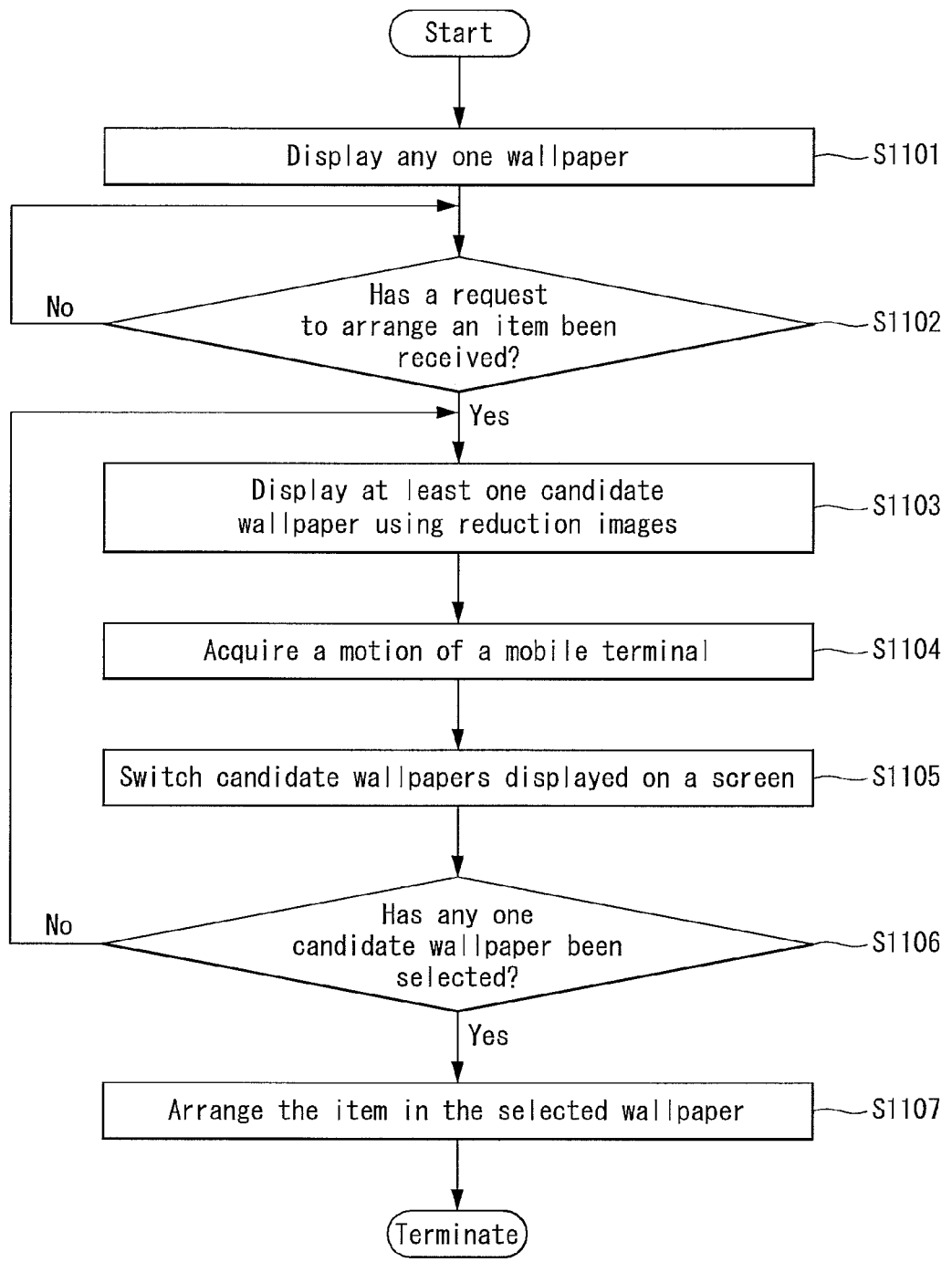
FIG. 16 is a flowchart of a method of controlling a mobile terminal according to a second exemplary embodiment.
Figure 17:
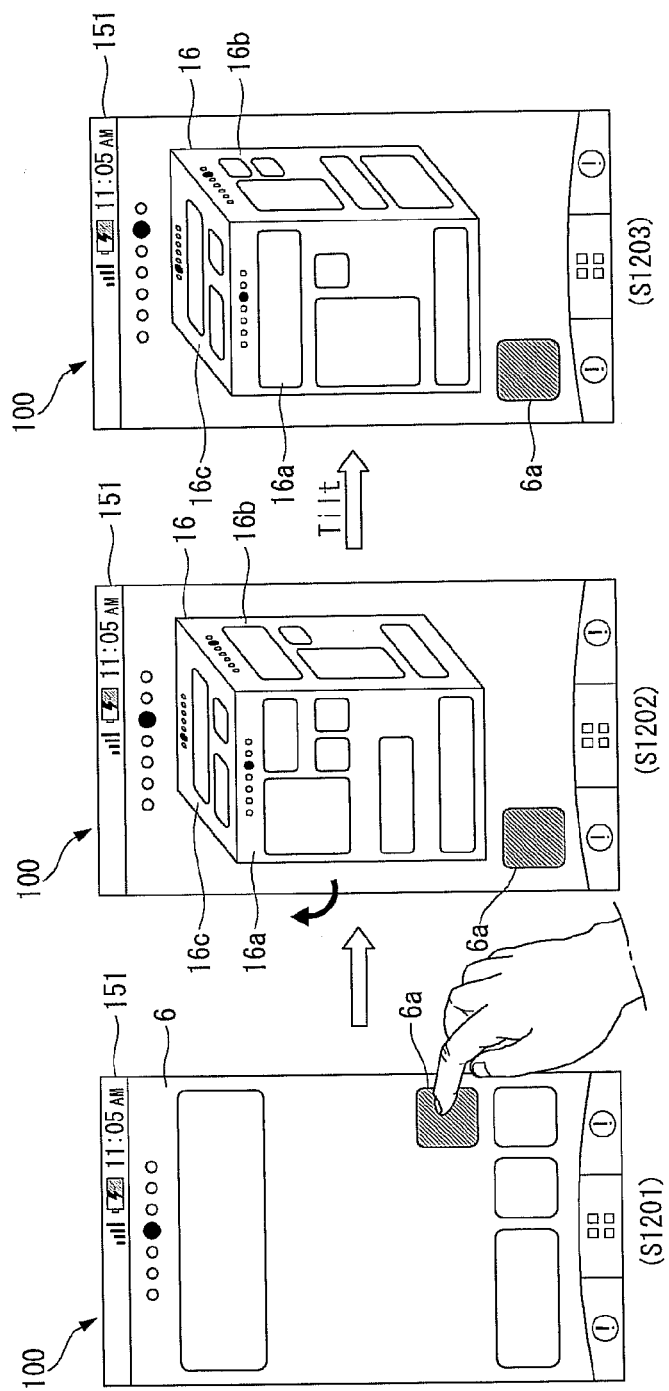
FIGS. 17 to 19 are diagrams showing examples in which a candidate wallpaper displayed is switched through a touch screen when an item arrangement mode is entered in a mobile terminal according to the second exemplary embodiment.
Figure 18:
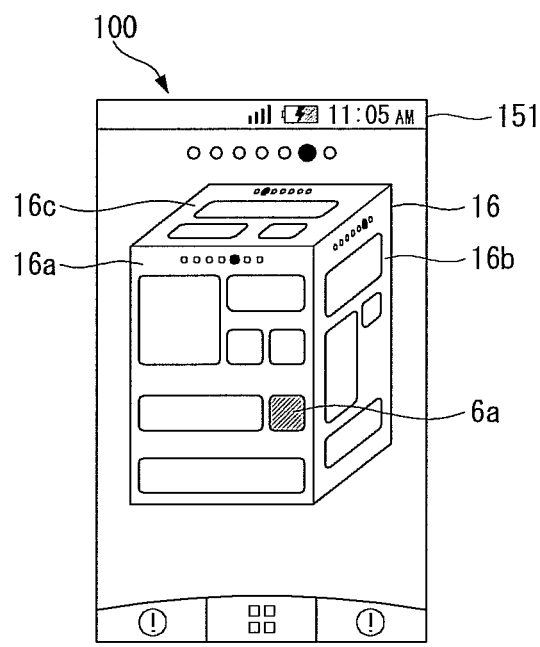
Figure 19:
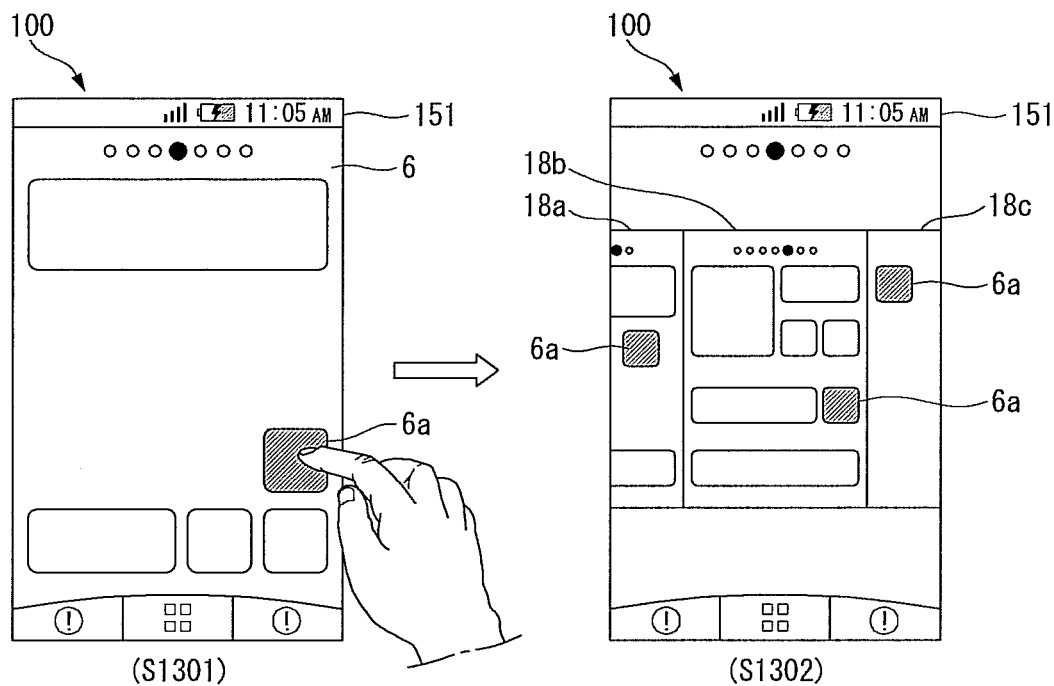

FIG. 16 is a flowchart of a method of controlling the mobile terminal 100 according to the second exemplary embodiment. FIGS. 17 to 19 are diagrams illustrating the method of controlling the mobile terminal 100 according to the second exemplary embodiment. Other embodiments and configurations may also be provided.

Referring to FIG. 16, the controller 180 may display any one of a plurality of wallpapers, stored in the memory 160, on the touch screen 151 in operation S1101. The controller 180 may determine whether a request to arrange a specific item has been received through the touch screen 151 in operation S1102. If, as a result of the determination, the request to arrange a specific item is determined to have been received, the controller 180 may enter the item arrangement mode. The controller 180 may display at least one wallpaper (i.e., a candidate wallpaper in which the specific item will be arranged) from among the plurality of wallpapers stored in the memory 160), on a screen (of the mobile terminal 100) by using a reduction image in operation S1103. The controller 180 may acquire or determine a motion of the mobile terminal 100 by using the sensing unit 140 in operation S1104. The controller 180 may switch or change the candidate wallpaper currently being displayed on the screen based on the acquired or determined motion of the mobile terminal 100 in operation S1105. The motion of the mobile terminal 100 may include a tilt of the mobile terminal 100 that is generated when the mobile terminal 100 is rotated around an axis that horizontally or vertically intersects the body of the mobile terminal 100.

FIGS. 17 to 19 are diagrams showing examples in which, in the item arrangement mode, a candidate wallpaper displayed on a screen is switched or changed.

Referring to FIG. 17, when a specific item 6*a* displayed on a screen is touched for a predetermined time or greater, the controller 180 may enter the item arrangement mode for the item 6*a* in operation S1201. The controller 180 may display a three-dimensional object 16 (or a perceived 3D object), having multiple faces consisting of a plurality of outer faces 16*a*, 16*b*, and 16*c*, on the screen. The controller 180 may display a candidate wallpaper in which the item 6*a* will be arranged in each of the outer faces 16*a*, 16*b*, and 16*c* of the three-dimensional object 16 in operation S1202. The controller 180 may acquire or determine a motion of the mobile terminal 100 through the sensing unit 140. The controller 180 may analyze the acquired or determined motion. When the mobile terminal 100 is tilted, the controller 180 may switch or change the candidate wallpapers by using the three-dimensional object 16 in operation S1203. In this example, the controller 180 may arrange the candidate wallpaper in each of the outer faces 16*a*, 16*b*, and 16*c* of the three-dimensional object 16 and display the candidate wallpapers. Further, the controller 180 may rotate the three-dimensional object 160 in a direction in which the mobile terminal 100 is tilted based on a tilt of the mobile terminal 100 acquired or determined by the sensing unit 140 and display the candidate wallpapers. Accordingly, a user may change the candidate wallpapers displayed on the screen by rotating the three-dimensional object 16 by tilting the mobile terminal 100. Alternatively, the user may arrange the item 6*a* in a desired wallpaper by dragging the item 6*a* to the desired candidate wallpaper. For example, in an example where the left side of the body of the mobile terminal 100 is tilted in the rear direction of the mobile terminal 100, the controller 180 may rotate the three-dimensional object 16 in the left direction and display the desired candidate wallpaper. Accordingly, a wallpaper next to a wallpaper currently being displayed on the front surface may be displayed on the front surface of the three-dimensional object 16.

Referring to FIG. 17, the controller 180 may display the item 6*a* (for which arrangement has been requested) outside the three-dimensional object 16 such that a user may drag the item 6*a* to a displayed candidate wallpaper through the three-dimensional object 16 and arrange or provide the item 6*a* in the displayed candidate wallpaper. However, embodiments are not limited thereto. According to an embodiment, in an example where candidate wallpapers are displayed using the three-dimensional object 16 as shown in FIG. 18, the controller 180 may previously arrange the item 6*a* (for which arrangement has been requested) in each of the candidate wallpapers such that a user previously check a state in which the item 6*a* is arranged. In this example, when the user touches a desired candidate wallpaper, the controller 180 may arrange the item 6*a* in the desired candidate wallpaper.

Referring to FIG. 19, when a specific item 6*a* displayed on a screen is touched for a predetermined time or greater, the controller 180 may enter the item arrangement mode for the item 6*a* in operation S1301. The controller 180 may display reduction images 18*a*, 18*b*, and 18*c* of a plurality of candidate wallpapers (i.e., candidate wallpapers in which the item 6*a* will be arranged) on the screen in operation S1302. The controller 180 may acquire or determine a motion of the mobile terminal 100 through the sensing unit 140. The controller 180 may analyze the acquired or determined motion. When the mobile terminal 100 is tilted, the controller 180 may switch or change the candidate wallpapers displayed on the screen. A method of switching or changing the candidate wallpapers may be similar to the method of switching or changing the wallpaper described in connection with the first exemplary embodiment, and a detailed description may be omitted.

An example where the controller 180 previously arranges the item 6*a* (for which arrangement has been requested) in the candidate wallpapers has been described as an example with reference to FIG. 19. According to an embodiment, the controller 180 may display candidate wallpapers in the state in which the item 6*a* is not arranged in the candidate wallpapers.

Referring back to FIG. 16, the controller 180 may repeatedly perform the operations S1104 and S1105 of switching or changing the candidate wallpapers, displayed on the touch screen 151, based on a motion of the mobile terminal 100 until any one of the candidate wallpapers is selected. When any one candidate wallpaper is selected in operation S1106, the controller 180 may arrange an item for which arrangement has been requested in the selected candidate wallpaper in operation S1107. The controller 180 may terminate the item arrangement mode and display the candidate wallpaper in which the item has been arranged as the entire wallpaper of the mobile terminal 100.

According to the above embodiments, an example where a user is sought to arrange or rearrange an item, the user can display candidate wallpapers in which the item may be arranged on a screen and check the displayed candidate wallpapers, by only tilting or rotating the mobile terminal 100. Accordingly, a user may arrange an item or select a wallpaper in which an item may be rearranged by simply moving the mobile terminal 100 without touching and switching a wallpaper.

In the above embodiments, an example where icons or widgets are arranged in a home screen has been described. However, embodiments are not limited thereto. The mobile terminal may be applied to all modes in which a user can arrange an item on a specific one of a plurality of wallpapers.

In the above embodiments, an example where a wallpaper in which an item will be arranged is selected from among stored wallpapers has been described as an example. However, embodiments are not limited thereto. This may be applied to an example where a new wallpaper is generated and an item is arranged in the new wallpaper, in an example where there is no wallpaper in which the item will be arranged. For example, in the state in which a first wallpaper or a last wallpaper (of stored wallpapers) is displayed on a screen (of the mobile terminal 100), when a user performs a drag to a bezel area on the screen (of the mobile terminal 100), the controller 180 may create and display a new wallpaper. In this example, the newly created wallpaper may be stored in the memory 160.

The above-described control method of the mobile terminal may be provided as a computer program(s) and may be implemented in digital microprocessors that execute the programs using a computer readable recording medium. The method of controlling the mobile terminal may be executed through software. The software may include code segments that perform required tasks. Programs or code segments may also be stored in a processor readable medium and/or may be transmitted according to a computer data signal combined with a carrier through a transmission medium or communication network.

The computer readable recording medium may be any data storage device that can store data that can thereafter be read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a memory to store a plurality of wallpapers;
a touch screen;
a sensing unit to sense a motion of the mobile terminal; and
a controller configured to:
display a first one of the stored plurality of wallpapers on the touch screen;
display a specific item on the screen;
receive a request to arrange the specific item on another one of the stored plurality of wallpapers;
in response to receiving the request to arrange the item, providing an item arrangement mode;
in response to providing the item arrangement mode, change the first wallpaper displayed on the touch screen to a second one of the stored plurality of wallpapers on the touch screen based on the motion of the mobile terminal sensed by the sensing unit, wherein the second wallpaper is displayed on the touch screen without displaying the specific item on the touch screen;
change the second wallpaper displayed on the touch screen to a third one of the stored plurality of wallpapers based on another motion of the mobile terminal sensed by the sensing unit;
receive an input on the third wallpaper, the input to identify a specific location for the specific item; and
display, on the touch screen, the specific item on the third one of the stored plurality of wallpapers at the specific location.

2. The mobile terminal of claim 1, wherein the sensed motion includes a sensed tilting of the mobile terminal.

3. The mobile terminal of claim 1, wherein the controller determines the selected wallpaper when the wallpaper displayed on the touch screen is touched.

4. The mobile terminal of claim 1, wherein the controller periodically changes the wallpaper displayed on the touch screen based on the sensed motion of the mobile terminal, until one of the wallpapers is selected.

5. The mobile terminal of claim 4, wherein the sensed motion includes a tilt direction, and the controller controls, based on the tilt direction, a display sequence of the wallpapers displayed on the touch screen during the change of the wallpaper displayed on the touch screen.

6. The mobile terminal of claim 4, wherein the sensed motion includes a degree of a tilt, and the controller controls, based on the degree of the tilt, a display speed of the wallpapers displayed on the touch screen during the change of the wallpaper displayed on the touch screen.

7. The mobile terminal of claim 1, wherein the controller receives the request to arrange the specific item when the displayed specific item is touched on the touch screen for at least a predetermined time.

8. The mobile terminal of claim 1, wherein the mobile terminal inactivates the display of the specific item while the displayed wallpaper changes based on motion of the mobile terminal sensed by the sensing unit.

9. The mobile terminal of claim 1, wherein the specific location is based on a touch input to the selected third one of the stored plurality of wallpapers.

10. A mobile terminal comprising:
a touch screen;
a sensing unit to sense a motion of the mobile terminal; and
a controller configured to:
  display an item on the touch screen;
  receive a request to arrange the item;
  display a reduced image of at least one of a plurality of wallpapers on the touch screen by displaying, on the touch screen, a perceived three-dimensional (3D) object that includes a plurality of outer faces,
  display the item on the touch screen at an area outside of the perceived 3D object while displaying the perceived 3D object;
  change the perceived 3D object displayed on the touch screen based on the sensed motion of the mobile terminal;
  determine a selected wallpaper from the displayed 3D object;
  receive a dragging input of the item from the area outside of the perceived 3D object to a selected one of the outer faces of the perceived 3D object;
  display, on the touch screen, the item on the selected wallpaper on the selected one of the outer faces of the perceived 3D object.

11. The mobile terminal of claim 10, wherein the controller displays the reduced image of each of the wallpapers on each of the outer faces of the 3D object, respectively.

12. The mobile terminal of claim 11, wherein the controller changes the image of the touch screen by performing a perceived rotation of the 3D object based on the sensed motion of the mobile terminal.

13. A method of controlling a mobile terminal having a touch screen, the method comprising:
  displaying a first wallpaper on the screen;
  displaying an item on the screen;
  receiving a request to arrange the displayed item on another wallpaper;
  sensing, after receiving the request, a motion of the mobile terminal;
  changing the first wallpaper displayed on the screen to a second wallpaper displayed on the screen based on the sensed motion, wherein the second wallpaper is displayed on the screen without the item being displayed on the screen;
  receiving a selection of the second wallpaper by a first touch input;
  receiving a second touch input on the displayed second wallpaper to identify a specific location for the specific item; and
  displaying the specific item on the second wallpaper after receiving the selection of the second wallpaper, wherein the specific item is displayed at the specific location of the second wallpaper corresponding to the second touch input.

14. The method of claim 13, wherein terminating the changing of the wallpaper displayed on the touch screen when the second wallpaper is selected.

15. The method of claim 13, further comprising periodically changing a wallpaper displayed on the touch screen based on the sensed motion of the mobile terminal, until one of the wallpapers is selected.

16. The method of claim 15, wherein the sensed motion includes a tilt direction, and changing the wallpaper displayed on the screen includes controlling a sequence in which the wallpapers are displayed on the touch screen based on the sensed tilt direction.

17. The method of claim 15, wherein the sensed motion includes a degree of a tilt, and changing the wallpaper displayed on the screen includes controlling a speed at which the wallpaper displayed on the touch screen are changed based on the sensed degree of the tilt.

18. A mobile terminal comprising:
a touch screen to receive a touch input;
a sensing unit to sense a motion of the mobile terminal; and
a controller configured to display a first wallpaper on the screen and to display at least a second wallpaper on the screen in response to the touch screen receiving a first touch input with respect to a specific item displayed on the first wallpaper, wherein the displayed at least second wallpaper is provided based on the sensed motion of the mobile terminal and the at least second wallpaper is initially displayed on the touch screen without displaying the selected item on the second wallpaper displayed on the touch screen, and in response to the mobile terminal receiving a selection of the displayed second wallpaper and in response to a second touch input at a specific location of the displayed second wallpaper, the item is displayed on the selected second wallpaper displayed on the touch screen at the specific location corresponding to the second touch input.

19. The mobile terminal of claim 18, wherein the displayed second wallpaper is selected when a touch input of the item is released.

* * * * *